March 13, 1951     D. B. GAYKEN     2,545,230
FRONT-WHEEL EQUALIZER FOR VEHICLES Filed April 4, 1949     2 Sheets-Sheet 1

Inventor
Dick B. Gayken
by M. Talbert Dick
Attorney

Witness
Merle A. Bjork

March 13, 1951 D. B. GAYKEN 2,545,230
FRONT-WHEEL EQUALIZER FOR VEHICLES
Filed April 4, 1949 2 Sheets-Sheet 2

Inventor
Dick B. Gayken
by M. Talbert Dick
Attorney

Witness
Merle A. Bjork

Patented Mar. 13, 1951

2,545,230

UNITED STATES PATENT OFFICE 2,545,230

FRONT-WHEEL EQUALIZER FOR VEHICLES

Dick B. Gayken, Waterloo, Iowa

Application April 4, 1949, Serial No. 85,385

3 Claims. (Cl. 280—104)

The principal object of my invention is to provide a front wheel connection for vehicles such as tractors or like that substantially equalizes the weight on the two front wheels regardless of the unevenness of surface over which the vehicle is moving.

More specifically, the object of my invention is to provide a weight equalizing means between the vehicle and the two front wheels of the vehicle so that even if one wheel is operating in a horizontal plane of the other wheel, both wheels will substantially have the same burden.

A further object of this invention is to provide a vehicle front wheels equalizer that is of simple, strong construction and not subject to ready wear or breakage.

A still further object of my invention is to provide a vehicle front wheels equalizer that makes for easy manual steering of the vehicle over uneven surfaces.

A still further object of my invention is to provide an equalizer of the front wheels of a vehicle that tends to hold the vehicle in a straight course regardless of the condition of the terrain over which the vehicle is moving.

A still further object of this invention is to provide an equalizer for the front wheels of a tractor or like that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

The use of front wheels equalizers for tractors is not new. However, most such devices consist of gears, gear teeth and like which are not only difficult and costly to manufacture but are highly subject to breakage. Furthermore, as the front wheels are usually in or near the same horizontal plane, the wear will be confined chiefly to only a few of the gear or like meshing teeth. Also meshing teeth or like are not good weight supporting means. I have overcome such problems by providing an equalizer that has no gears or meshing teeth construction.

Figure 1:
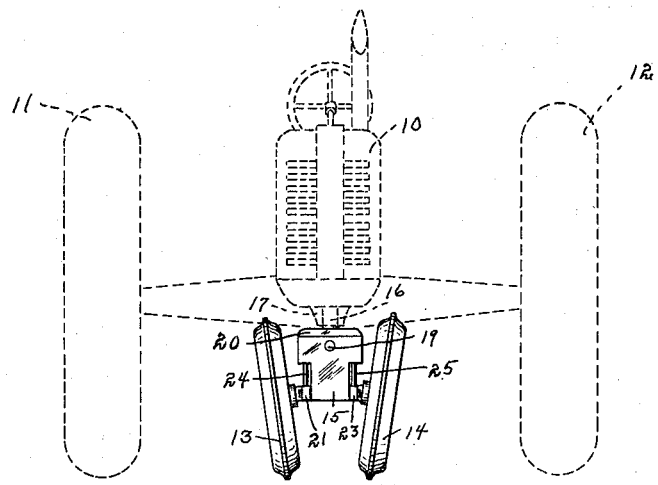
Fig. 1 is a front view of my device installed and in use.
Figure 2:
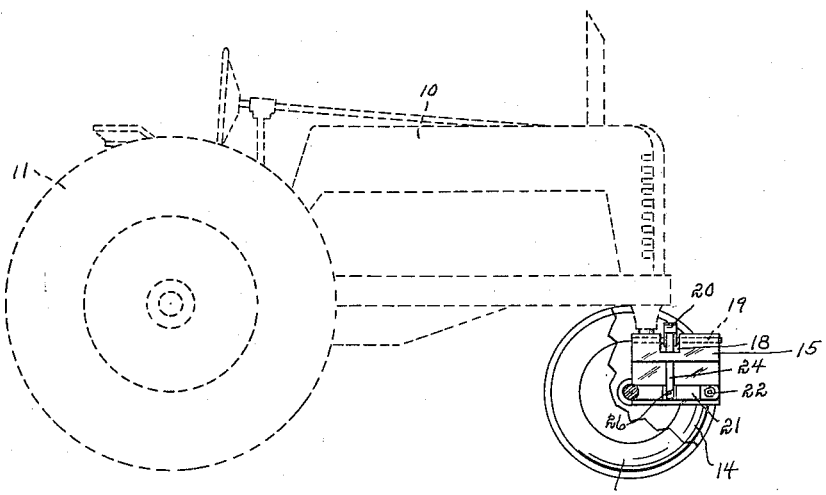
Fig. 2 is a side view of my device installed on a tractor but with a portion of one of the front wheels cut away to more fully illustrate its construction.
Figure 3:
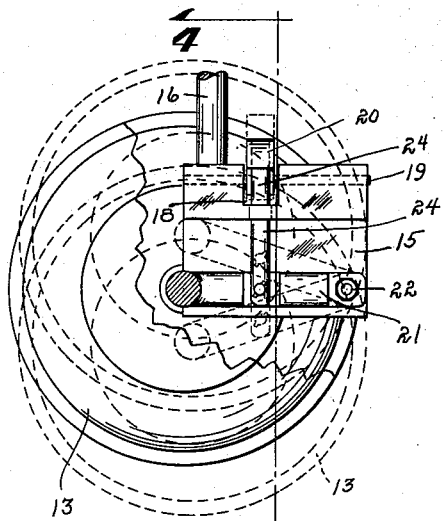
Fig. 3 is an enlarged right hand side view of the device illustrating its operation.
Figure 4:
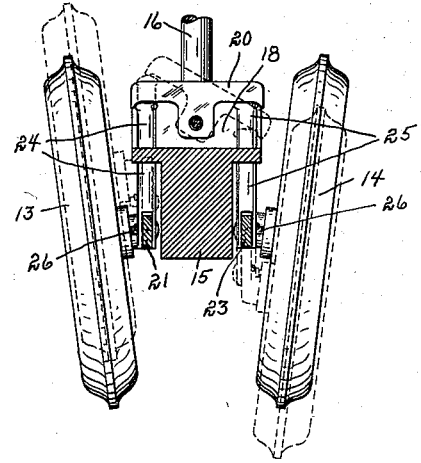
Fig. 4 is a front end sectional view of the device taken on line 4—4 of Fig. 3.
Figure 5:
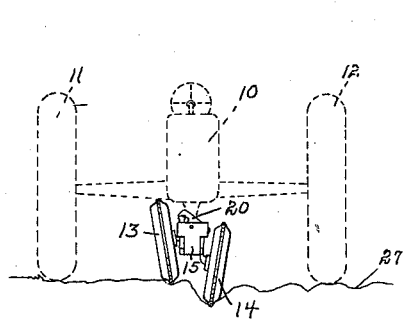
Fig. 5 is a front end view of the device installed and showing the right front wheel of the tractor in an elevated position.
Figure 6:
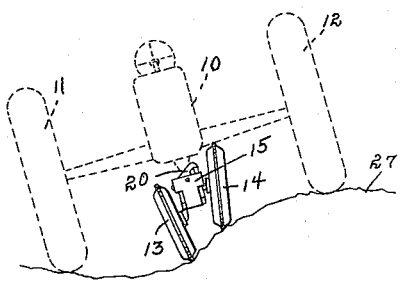
Fig. 6 is a front end view of the device installed and showing the left front wheel of the tractor in an elevated position relative to the other front wheel.

Referring to the drawings I have used the numeral 10 to designate an ordinary tractor (shown in dotted lines) and having the usual two rear wheels 11 and 12. The numerals 13 and 14 designate the two ordinary front wheels of a tractor. It is between these two front wheels and the front lower end of the tractor that I install my device and which I will now describe in detail. The numeral 15 designates the block base member of the device, T-shaped in cross-section, as shown in Fig. 4. The top of this block is rotatably secured to the front under-end of the tractor by any suitable means such as a vertical stub shaft 16 and bearing 17, or like. By any such construction the tractor becomes steerable in the usual manner. Transverse of the longitudinal axis of the block and extending across the top of the block is a slot 18. The numeral 19 designates a shaft in the head of the T-shaped block, extending longitudinally thereof, centrally located, and extending transversely through the slot 18, as shown in Fig. 3. The numeral 20 designates a bar member rotatably mounted around the shaft 19 at its center and capable of rocking operation in the slot 18. The numeral 21 designates a wheel shaft axle having its front end portion hinged to the lower right front side of the block 15 by a stud bolt 22 or like means. This axle shaft normally extends directly to the rear, along the right lower side of the block and then is bent at a right angle outwardly to take and rotatably support the front tractor wheel 13. The numeral 23 designates a wheel shaft axle having its front end portion hinged to the lower left front side of the block 15 in the same manner as the axle shaft 21 is secured. This axle shaft 23 normally extends directly to the rear along the left lower side of the T-shaped block 15, and then is bent outwardly at a right angle to take and rotatably support the front tractor wheel 14. The numeral 24 designates a vertical rod slidably mounted in the head of the T-shaped block, having its upper end portion slidably extending into the right end portion of the slot 18 for engagement with the under right end portion of the bar 20 and its other end portion extending along the outer lower right side of the block to a position where it is pivoted to the center length portion of the axle shaft 21. The numeral 25 designates a second vertical rod slidably mounted in the head of the T-shaped block, having its upper end portion slidably extending into the left end portion of the slot 18 for engagement with the under left end portion of the bar 20, and its other end portion extending along the outer lower left side of the block to a position where it is pivoted to the center length portion of the axle shaft 23. The method of pivotally connecting the two rods 24 and 25 to the two axle shafts 21 and 23 may be of any suitable means. In the drawings I show the lower ends of the two rods split to embrace the two axle shafts, respectively, and a pin 26 extending through the same. The upper end of each of the rods 24 and 25 may be enlarged, as shown in Fig. 4 to prevent them from dropping downwardly through their bearing means in the block. By this construction the front end weight of the tractor will first be exerted on the block, thence the shaft 19, thence to the bar 20, thence to the rods 24 and 25, thence to the axle shafts 21 and 23, thence to the wheels 13 and 14, and thence to the ground surface 27. By the bar 20 being pivoted at its center the weight will be substantially equalized between the two wheels. This is true even though one wheel is elevated (due to the surface over which the tractor is moving) relative to the other front wheel, as shown in Fig. 5 and Fig. 6. If one front wheel is moved upwardly, its axle shaft which is in the form of a crank arm will be moved upwardly accordingly, thereby raising that side end of the bar 20 and forcing the other end of the bar downwardly to lower the hinged axle shaft at the other side of the T-shaped block. In other words, the up or down movement of either front wheel will complement the movement of the other front wheel in the opposite direction. This desirable pressure equalization regardless of the relative positions of the two front wheels promotes stability and control of the tractor. Both front wheels will bear their respective load at all times. As the tractor moves over uneven surfaces the two front wheels will move upwardly and downwardly in opposite movements to each other so that both wheels will always be in contact with the earth surface. This is especially desirable when the two front tractor wheels are relatively small and close together, as shown in Fig. 1. This vertical contra-reciprocation of the two wheels is accomplished without affecting the normal position of the front end of the tractor. This means not only better tractor operation but smoother riding qualities over rough ground.

Many parts of my device are duplicates. This is true of the two vertical rods, the two crank axle shafts, the two pin shafts 26, and two bolts 22. A shield or case may cover my device if desired for safety reasons and also to keep out undesirable foreign matter.

Some changes may be made in the construction and arrangement of my front wheels equalizer for vehicles without departing from the real spirit and purpose of my invention, and it is my intention to cover by my claims, any modified forms of structure or use of mechanical equivalents which may be reasonably included within their scope.

I claim:

1. In a device of the class described, a base member T-shaped in cross-section, a transverse slot in the top of said base member, a bar pivoted at its center and capable of rocking action within said slot, a vertical rod slidably mounted in said base having its upper end portion extending into said slot and below one end portion of said bar and its other end portion extending downwardly along the lower outer side portion of said base, a second vertical rod slidably mounted in said base having its upper end portion extending into said slot and below the other end portion of said bar, and its other end portion extending downwardly along the other lower outer side portion of said base, an axle shaft hinged to one side of said base member and pivotally connected to the lower end portion of the vertical rod on that side of the base, and a second axle shaft hinged to the other side of said base member and pivotally connected to the lower end portion of the vertical rod on that side of the said base member.

2. In a device of the class described, a base member T-shaped in cross-section, a transverse slot in the top of said base member, a bar pivoted at its center and capable of rocking action within said slot, a vertical rod slidably mounted in said base having its upper end portion extending into said slot and below one end portion of said bar and its other end portion extending downwardly along the lower outer side portion of said base, a second vertical rod slidably mounted in said base having its upper end portion extending into said slot and below the other end portion of said bar, and its other end portion extending downwardly along the other lower outer side portion of said base, an axle shaft hinged to one side of said base member and pivotally connected to the lower end portion of the vertical rod on that side of the base, a second axle shaft hinged to the other side of said base member and pivotally connected to the lower end portion of the vertical rod on that side of the said base member, and a means for limiting the downward sliding movement of each of said two vertical rods.

3. In a device of the class described, a base member T-shaped in cross-section, a bar pivoted at its center to the upper portion of said base member, a vertical rod slidably mounted in said base having its upper end below one end portion of said bar and its other end portion extending downwardly along the lower outer side portion of said base, a second vertical rod slidably mounted in said base having its upper end below the other end portion of said bar and its other end portion extending downwardly along the lower outer side portion of said base, an axle shaft hinged to one side of said base member and pivotally connected to the lower end portion of the vertical rod on that side of the base, and a second axle shaft hinged to the other side of said base member and pivotally connected to the lower end portion of the vertical rod on that side of the said base member.

DICK B. GAYKEN.

REFERENCES CITED

The following references are of record in the file of this patent:

UNITED STATES PATENTS

| Number | Name | Date |
|---|---|---|
| 1,890,975 | Erdahl | Dec. 13, 1932 |
| 2,217,818 | Ronning | Oct. 15, 1940 |